(12) United States Patent
Potucek et al.

(10) Patent No.: US 7,744,237 B2
(45) Date of Patent: Jun. 29, 2010

(54) SELECTABLE BEAM LENS FOR UNDERWATER LIGHT

(75) Inventors: Kevin Potucek, Far Hills, NJ (US); Dennis Dunn, Thousand Oaks, CA (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 0 days.

(21) Appl. No.: 12/357,137

(22) Filed: Jan. 21, 2009

(65) Prior Publication Data

US 2009/0129082 A1  May 21, 2009

Related U.S. Application Data

(62) Division of application No. 11/260,740, filed on Oct. 27, 2005, now Pat. No. 7,488,084.

(60) Provisional application No. 60/623,607, filed on Oct. 29, 2004.

(51) Int. Cl.
  *F21V 33/00* (2006.01)
(52) U.S. Cl. .................. 362/101; 362/244; 362/267; 362/374; 362/477; 362/645
(58) Field of Classification Search .......... 362/101, 362/244, 267, 282–284, 322–325, 374, 477, 362/645
  See application file for complete search history.

(56) References Cited

U.S. PATENT DOCUMENTS

| 2,219,848 | A | * | 10/1940 | Schaffner | 362/215 |
| 3,302,014 | A | * | 1/1967 | Moore et al. | 362/267 |
| 6,273,588 | B1 | * | 8/2001 | Arakelian | 362/267 |
| 2006/0072323 | A1 | * | 4/2006 | Poggi | 362/267 |

* cited by examiner

*Primary Examiner*—Sandra L O'Shea
*Assistant Examiner*—Maghan K Dunwiddie
(74) *Attorney, Agent, or Firm*—Greenberg Traurig, LLP

(57) ABSTRACT

A lens for a wet environment lighting device that has a fixture with an interior that has an opening, and at least one light source located within the fixture interior. Light from the light source proceeds out through the opening. The lens is for location in front of the fixture and the light source located therein and the lens encloses the opening from the wet environment. The lens has a first light-directing area for directing light in a first beam pattern. The lens also has a second light-directing area, distinct from the first light-directing area, for directing light in a second beam pattern, distinct from the first beam pattern. The lens is positioned relative to fixture and light source therein to select from the distinct beam patterns based on the alignment of the light-directing areas relative to the light source resulting from a positioning of the lens.

9 Claims, 5 Drawing Sheets

SELECTABLE BEAM LENS FOR UNDERWATER LIGHT

CROSS-REFERENCE TO RELATED APPLICATIONS

This application is a divisional of U.S. application Ser. No. 11/260,740 filed on Oct. 27, 2005, now U.S. Pat. No. 7,488,084 which claims the benefit of U.S. Provisional Application No. 60/623,607 filed on Oct. 29, 2004, both of which are entirely incorporated herein by reference.

BACKGROUND OF THE INVENTION

Lights that operate in a wet environment are known. One example of such a wet environment light is an underwater light that is within an aquatic environment. One example of an aquatic environment is a swimming pool.

Underwater lights have different objectives depending on the shape and dimension of the aquatic environment that has to be illuminated and the relative locations of the lights therein. In one case, the objective could be to deliver light longitudinally (horizontally), while in another, the object could be to deliver a homogeneous illumination in all directions (horizontally and vertically). Presently, such different objectives are accomplished by manufacturing lenses designed specifically to achieve the desired beam patterns. Such an approach requires the lens to be removed and replaced to obtain a different beam pattern. Also, such an approach requires separate manufacture, supply, etc. of the different lenses. As one example of such separate aspects, inventories of different lens models need to be maintained.

As can be appreciated, such manufacture, supply, etc., is costly and time consuming. Moreover, there may also the added expense, etc. created by a wrong type of lens being delivered or even installed at a use site.

SUMMARY OF THE INVENTION

In accordance with one aspect, the present invention provides a lens for a wet environment lighting device that has a fixture with an interior that has an opening, and at least one light source located within the fixture interior. Light from the light source proceeds out through the opening. The lens is for location in front of the fixture and the light source located therein and the lens encloses the opening from the wet environment. The lens has a first light-directing area for directing light in a first beam pattern. The lens also has a second light-directing area, distinct from the first light-directing area, for directing light in a second beam pattern, distinct from the first beam pattern. The lens is positioned relative to fixture and light source therein to select from the distinct beam patterns based on the alignment of the light-directing areas relative to the light source resulting from a positioning of the lens.

In accordance with another aspect, the present invention provides a lighting device for a wet environment. The lighting device has a fixture for location within the wet environment and that has an interior with an opening. The lighting device has at least one light source located within the fixture interior. Light from the light source can proceed from the interior through the opening. The lighting device has a lens located in front of the fixture and the light source located therein. The lens encloses the opening from the wet environment and has a plurality of light-directing areas. Each light-directing area has a different light-directing feature. The relative position between the lens and the light source is variable to associate different light-directing areas with the light source and provide different light beam patterns for light proceeding from the light source through the lens and into the wet environment dependent upon the different light-directing areas and light source associations resulting from the position variation.

In accordance with yet another aspect, the present invention provides a lighting device for a wet environment. The lighting device has a fixture for location within the wet environment and that has an interior with an opening. The lighting device has multiple light sources located within the fixture interior. The lighting device has a lens located in front of the fixture and the light sources located therein. The lens encloses the opening from the wet environment. The relative position between the lens and the light sources is variable to align different light-directing areas with the light sources and provide different light beam patterns for light proceeding from the light source through the lens and into the wet environment dependent upon the different light-directing areas and light source alignments resulting from the position variation.

In accordance with still another aspect, the present invention provides a lighting device for a wet environment. The lighting device has a fixture for location within the environment and that has an interior with an opening. The lighting device has at least one light source located within the fixture interior. The lighting device has a lens located in front of the fixture and the light source located therein. The lens closes the opening from the wet environment. The lens is repositioned to select from multiple, distinct beam patterns based on the alignment of the light-directing areas relative to the light source resulting from a repositioning of the lens.

DETAILED DESCRIPTION OF AN EXAMPLE EMBODIMENT

Figure 1:
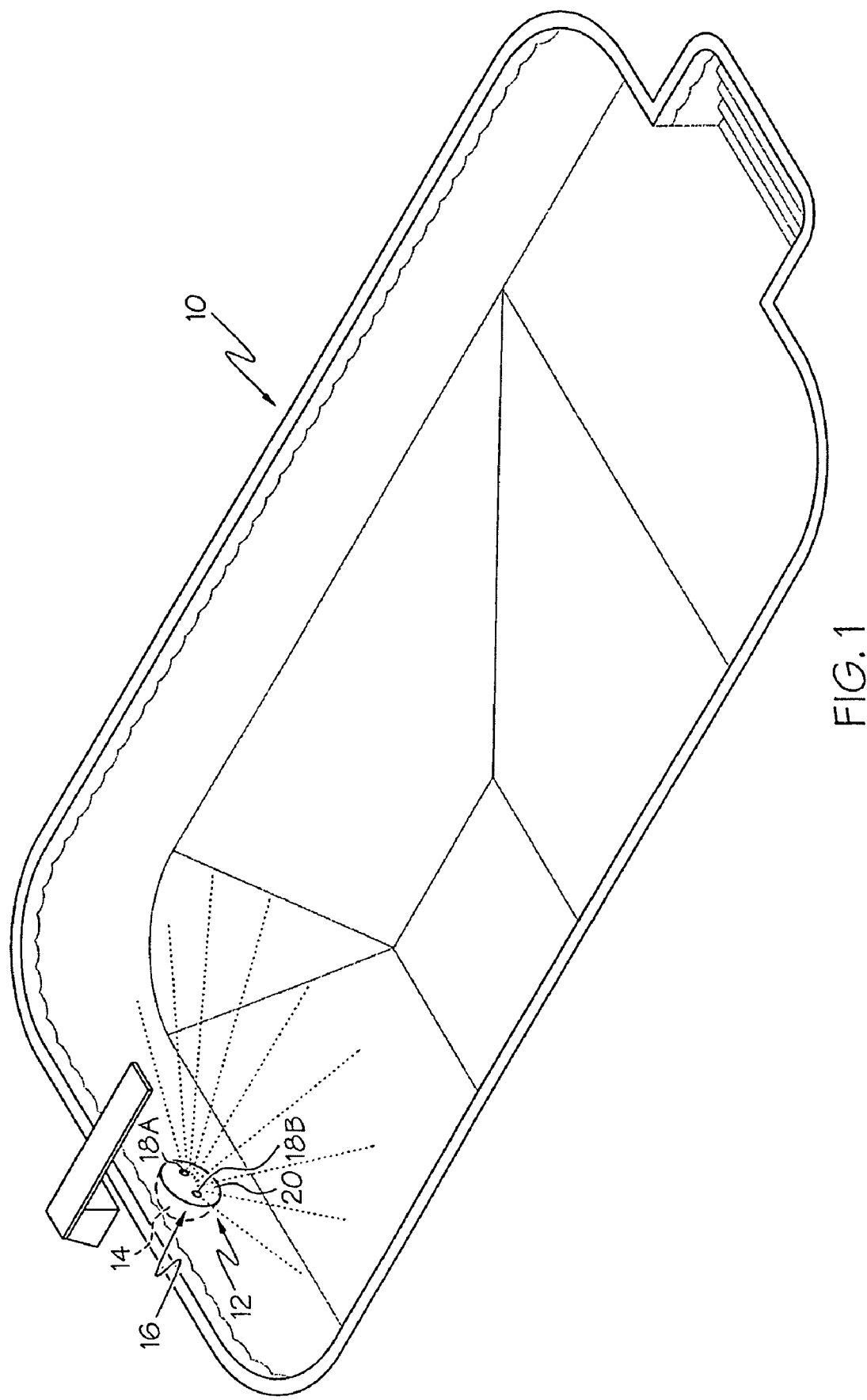
FIG. 1 is a perspective view of an example wet environment in which an example lighting device in accordance with the present invention can be used.

Certain terminology is used herein for convenience only and is not to be taken as a limitation on the present invention. Further, in the drawings, the same reference numerals are employed for designating the same elements throughout the figures, and in order to clearly and concisely illustrate the present invention, certain features may be shown in schematic form.

FIG. 1 shows an example wet environment 10, which happens to be an aquatic environment, in which a lighting device 12 in accordance with one aspect of the present invention can be used to provide illumination. It should be appreciated that the present invention can be used in various other wet environments. Some examples of such other wet environments include spas, baths, ponds, fountains, water spraying devices, and the like. Herein, the wet environment 10 is presented as a swimming pool 10. However, the swimming pool 10 is not a limitation on the present invention.

In the shown example, the lighting device 12 is installed at the periphery of the swimming pool 10. More specifically, the lighting device 12 is located on one of the walls of the swimming pool 10. Also, the lighting device 12 is located below the waterline of the water located within the swimming pool 10. As such, light proceeding from the lighting device 12 directly illuminates the water. It is to be appreciated that the lighting device 12 may be otherwise located within the swimming pool 10, such as at or near a waterline (e.g., only partially submerged within water). In general, it is to be appreciated that the lighting device 12 may be at any desired location within a wet environment.

The lighting device 12 includes a fixture 14 that has an interior 16. It is to be appreciated that the fixture 14 is only schematically shown in the figures. This schematic showing indicates that the specific construction and configuration of the fixture 14 are not a limitation on the present invention. Moreover, the construction and configuration of the fixture 14 may be varied. For example, the fixture 14 may even be provided by the wall structure of the swimming pool 10 itself.

At least one light source 18A is located within the interior 16 of the fixture 14. An opening into the interior 16 permits light from the light source 18A to proceed out of the interior. Similar to the aspect that the fixture 14 is not a limitation on the present invention, the interior 16 is not a limitation on the present invention. As such, the interior 16 of the fixture 14 may be varied. As one example, the interior is configured such that the fixture 14 provides for light reflection out of the fixture.

Although the lighting device 12 in accordance with one aspect of the present invention includes at least one light source 18A, another aspect of the present invention provides for the lighting device having multiple light sources. For one particular example, which is described herein, the lighting device 12 includes two light sources 18A and 18B. Each light source (e.g., 18A) may have any construction and configuration. In general, each light source is electrically energized to emit light. Some example types of light sources include incandescent, fluorescent, halogen, and light-emitting diode. Also, each light source may have one or more specialized properties or characteristics, such being a color changing light source.

A lens 20 of the lighting device 12 is in accordance with one aspect of the present invention. The lens 20 is located in front of the fixture 14 and the light sources 18A, 18B located therein. The lens 20 is transparent, or at least translucent, to the light proceeding from the light sources.

The lens 20 may be made of glass, plastic, acrylic, or other substance that is transparent or translucent to the light. As such, the light proceeds through the lens 20. In the shown example, the lens 20 encloses the opening of the fixture 14 and is in direct contact with the water within the swimming pool 10. As such, the lens 20 acts as a barrier between the water and the interior 16 of the fixture 14. In the shown example, the lens 20 is a unitary member. However, it is to be appreciated that the lens 20 may be multi-component. Within such a multi-component lens, the lenses may be in a stacked arrangement along a major axis or the lenses may be located adjacent to each other in an array. Also, within such a multi-component lens, each lens component may have light-directing properties (e.g., refraction) or some of the lenses may have light-directing properties. In one particular embodiment, the lens is a multi-component lens that includes a cover lens that is in contact with the wet environment. The cover lens may not have light-directing properties (e.g., the cover lens is optically inert). For example, the cover lens may just have smooth planer faces. Within a multi-component lens, the lenses may be spaced apart or in contact with each other.

A seal (not shown) may be located between the fixture 14 and the lens 20 to prevent water entry into the fixture 14 at an edge of the lens 20. It is to be appreciated that the seal may take any form, may be of any material, etc. to accomplish a sealing function. In one example, the seal is a separate ring that is sandwiched between the fixture 14 and the lens 20. However, it is to be appreciated that the seal may be attached to or part the fixture 14 or the leas 20. Also, it is to be appreciated that the lens 20 can be secured to the fixture 14. The methodology and structure for sealing and securing the lens 20 to the fixture 14 may be varied and are not limitations on the present invention.

Figure 2:
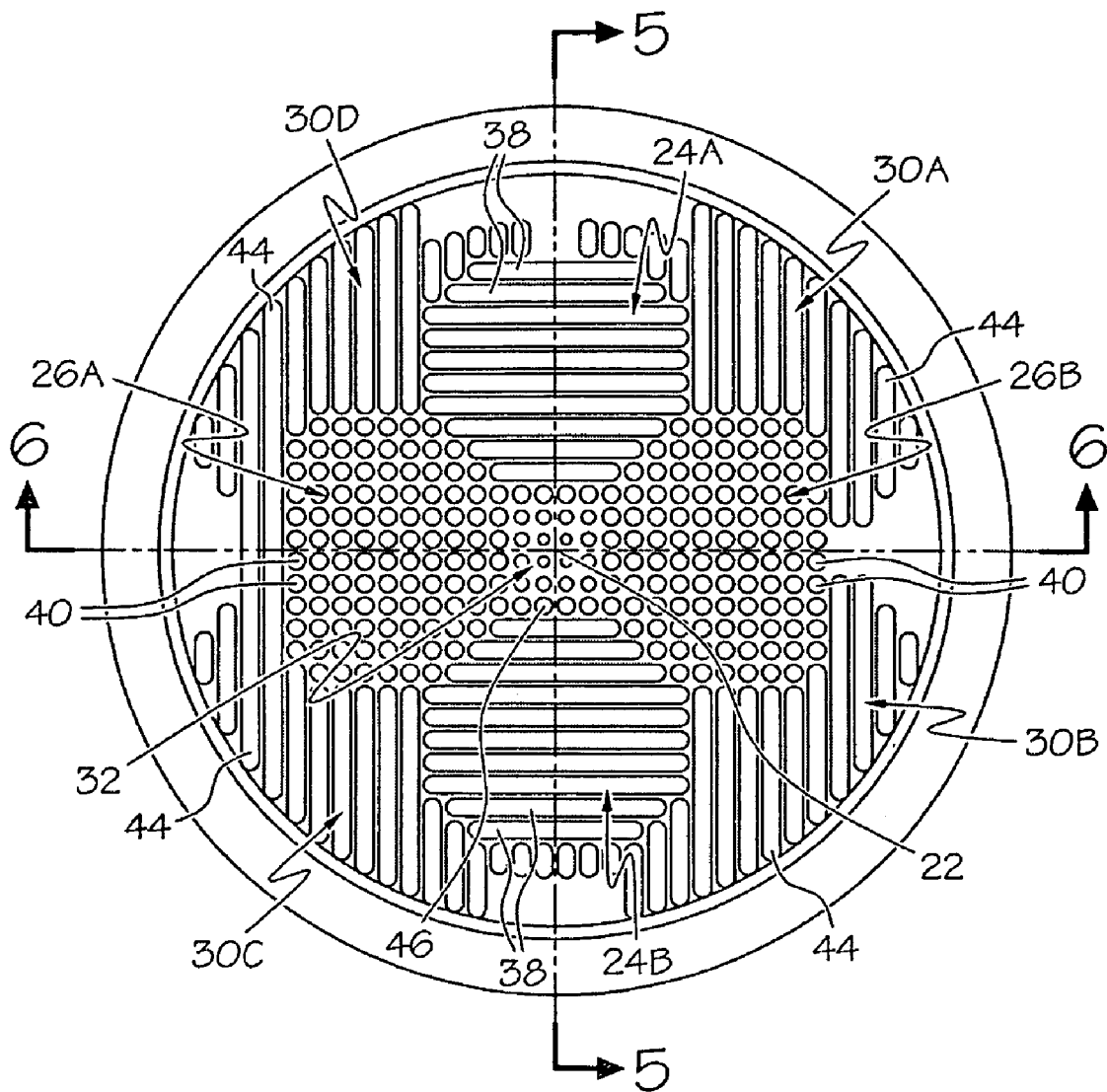
FIG. 2 is a front view of an example embodiment of a selectable beam lens that can be used in the lighting device shown in FIG. 1.

One example of the lens 20 is shown in FIG. 2. The example lens 20 shows light-directing areas in accordance with one aspect of the present invention. However, it must be understood that the example need not be a limitation on the present invention.

In this example, two pairs of primary light-directing areas 24A, 24B and 26A, 26B are provided. Within each of the two pairs of light-directing areas, at least one area can be associated with one of the light sources. Within the shown example, the association of a light-directing area with a light source is accomplished via positioning of the lens such that the light-directing area is in front of one of the light sources. In other words, the light-directing area is aligned with the light source.

Of course, it is to be appreciated that the light-directing areas need not be provided in pairs. Such an embodiment would be suitable for a lighting device that has only one light source. Also, it is to be appreciated that the number of light-directing areas, or pairs of areas, need not correspond to the number of light-directing areas. As one example, the embodiment that has only one light source would have a lens that has at least two light-directing areas that can be associated or aligned with the lighting device, for such aspects, the light sources and/or the light-directing areas would have locations (e.g., off-axis locations) that would permit different association/alignment combinations.

In the shown example, the lens 20 is circular with a central axis 22, and each pair of light-directing areas (e.g., 24A, 24B) is symmetrically disposed about the central axis of the lens. Specifically, for each pair (e.g., 24A, 24B), the light-directing areas are located on opposed sides of the central axis 22. Also, the light-directing areas are located (e.g., center-located) away from the axis 22. Still further, the two pairs of light-directing areas 24A, 24B and 26A, 26B are interspersed or alternated with each other about the axis 22. In the shown example, the pairs of light-directing areas 24A, 24B and 26A, 26B can be considered to be oriented 90 degrees, relative to each other.

In view of the circular shape of the lens 20, association or alignment of one of the light-directing areas (e.g., 24A) relative to a light source (e.g., 18A) is accomplished via rotation of the lens. In the shown example, the lens is rotated 90 degrees, to go from one association or alignment position to another association or alignment position. The rotation can be accomplished while the lens 20 is loosely attached to the fixture 14. In other words, the lens 20 need not be completely removed from the fixture 14 to change the light beam that is provided by the lighting device 12. During rotation, the lens position is variable without change of distance between the lens 20 and the light sources 18A, 18B. However, it is to be appreciated that the selection of association or alignment of one of the light-directing areas (e.g., 24A) relative to a light source (e.g., 18A) may be a one-time determination. For example, the selection may be done when the lens 20 is initially installed. In summary, one aspect of the present invention provides for the ability to select a beam pattern from a single lens.

Focusing again upon the example that has two pairs of primary light-directing areas 24A, 24B and 26A, 26B, the light-directing areas are arranged so that two distinct beam patterns can be achieved depending on the location of the light-directing areas relative to the light sources 18A and 18B. In the shown example embodiment, the two light sources 18A and 18B are located side by side horizontally (FIG. 3A) and the light-directing areas that are immediately in front of the light sources 18A and 18B (i.e., associated or aligned) will primarily be responsible for the resulting beam patterns. Light emitted from the light sources 18A and 18B will be directed by the associated/aligned light-directing areas dependent upon the particular light-directing properties.

Within the shown example, the light-directing properties of the light-directing areas 24A, 24B and 26A, 26B include refraction characteristics provided by curvatures on the surface of the lens 20. Thus, each light-directing area (e.g., 24A) creates a distinct beam pattern, as compared to the other light-directing area choice (e.g., 26A). In the shown example, the beam pattern is dependent upon the geometry of the light-directing area (e.g., 24A) that is directly in front of the light sources 18A and 18B. Briefly, the two light-directing areas have different geometries. However, it is to be appreciated that other light-directing properties could be utilized. Examples of such other properties may include diffraction gratings, holographic aspects, selective transmission, and the like.

Figure 3A:
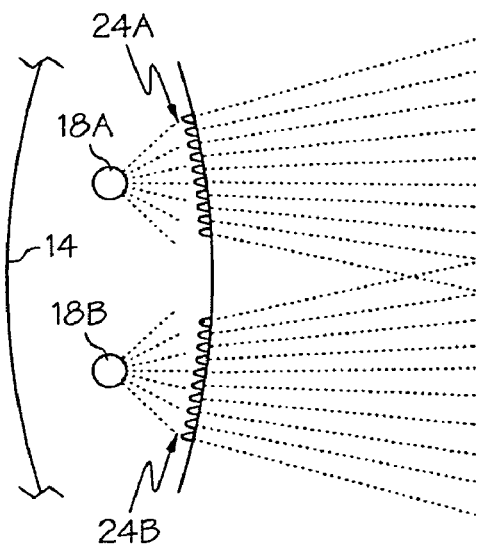
FIG. 3A is a schematic, top view illustration of an example light-directing effect from a first primary light-directing area of the selectable beam lens of FIG. 2.
Figure 3B:
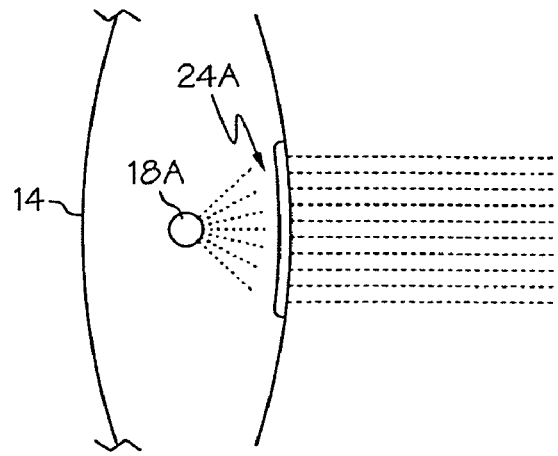
FIG. 3B is a schematic, side view illustration of the light-directing effect of FIG. 3A.

FIGS. 3A and 3B are schematic illustrations to show sample beam patterns that may created by an embodiment of the lens 20. It should be appreciated that the sample beam patterns are provided only to illustrate the concept of different beam patterns and are not intended to provide an exact indication of actual beam patterns.

FIG. 3A is a top view of the lens 20 which shows the light sources 18A and 18B located side by side on a horizontal plane while FIG. 3B is a side view of the lens 20 in which one of the light sources is hidden behind the other. In FIGS. 3A and 3B, the first primary light-directing areas 24A, 24B are associated (e.g., aligned) with the light sources 18A, 18B. Light emitted from the light sources 18A, 18B is dispersed significantly horizontally, as shown in FIG. 3A (see dotted lines), but the light is not significantly dispersed vertically, as shown in FIG. 3B (see dotted lines). As such, the first primary light-directing areas 24A, 2413 include structure for directing light such that the first beam pattern is laterally oriented.

Figure 4A:
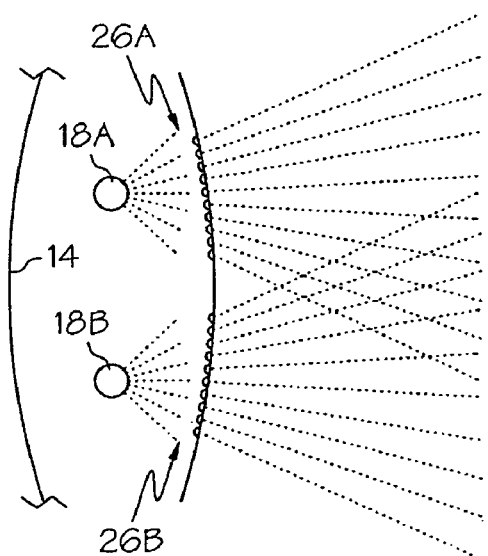
FIG. 4A is a schematic, top view illustration of an example light-directing effect from a second primary light-directing area of the selectable beam lens of FIG. 2.
Figure 4B:
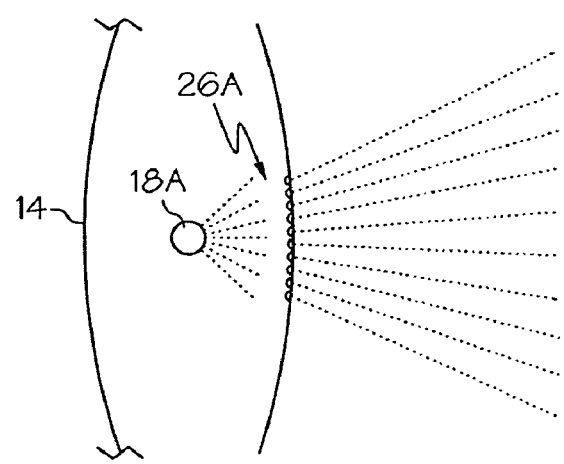
FIG. 4B is a schematic, side view illustration of the light-directing effect of FIG. 4A.

FIGS. 4A and 4B are similar to FIGS. 3A and 4B, but the second primary light-directing areas 26A, 26B are associated (e.g., aligned) with the light sources 18A, 18B. After being refracted by the second primary light-directing areas 26A, 26B the light is significantly dispersed horizontally, as shown in FIG. 4A (see dotted lines), and significantly dispersed vertically, as shown in FIG. 4B (see dotted lines). As such, the second primary light-directing areas 26A, 26B includes structure for directing light such that the first beam pattern is both laterally and vertically oriented. The dispersion is thus omni-directional within a hemisphere in front of the lens 20. In contrast with the first primary light-directing areas 24A, 24B, the second primary light-directing areas 26A, 26B cause light to have dispersion both horizontally and vertically, offering a more homogeneous illumination in all directions. It is to be appreciated that the beam patterns shown herein are only a set of examples and that other beam patterns can be accomplished with light-directing areas made up of protrusions of different geometry.

The versatility of the present invention derives from the fact that a number of distinct beam patterns can be obtained as or after the lens 20 is installed for end use. In the preferred embodiment, such versatility is obtained by rotating the lens 20 about its central axis 20 without removing any parts. With two primary light-directing areas, rotating the lens 20 90 degrees about its central axis 22 results in two distinct beam patterns.

It is to be appreciated that different arrangements of light-directing areas might make it possible to generate more than two beam patterns from the rotation of the lens 20. Therefore, the angle of rotation needed to change beam patterns will depend on the number of possible beam patterns and is not necessarily limited to 90 degrees.

Turning again to the specific example shown in FIG. 2, the outer periphery of the lens 20 is circular. One specific example of the lens 20 has a diameter that is approximately 8.25 inches. Each of the light-directing areas 24A, 24B and 26A, 26B has a generally hexagonal shape, and the light-directing areas abut each other. The shown example also has first ancillary light-directing areas 30A-30D extending over an outer portion of the lens 20 and a second ancillary light-directing area 32 covering an area at the center of the lens. The first ancillary light-directing areas 30A-30D may be contiguous or separated. The shown example includes both contiguous and separated areas. It is to be appreciated that some or all of the ancillary areas may be omitted or replaced with a different ancillary light-directing area.

Figure 5:
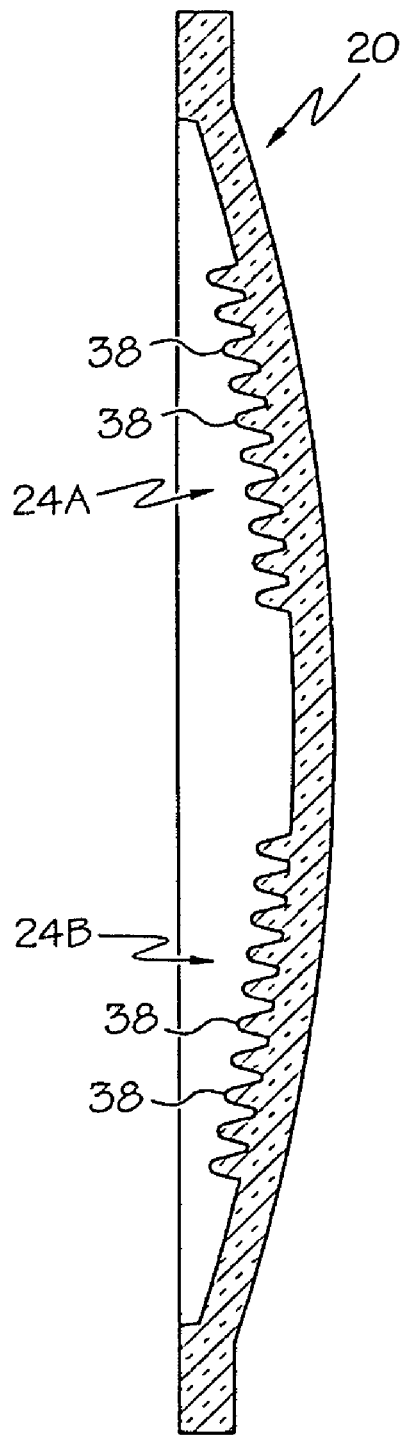
FIG. 5 is a cross-sectional view taken along line 5-5 through the selectable beam lens of FIG. 2.
Figure 6:
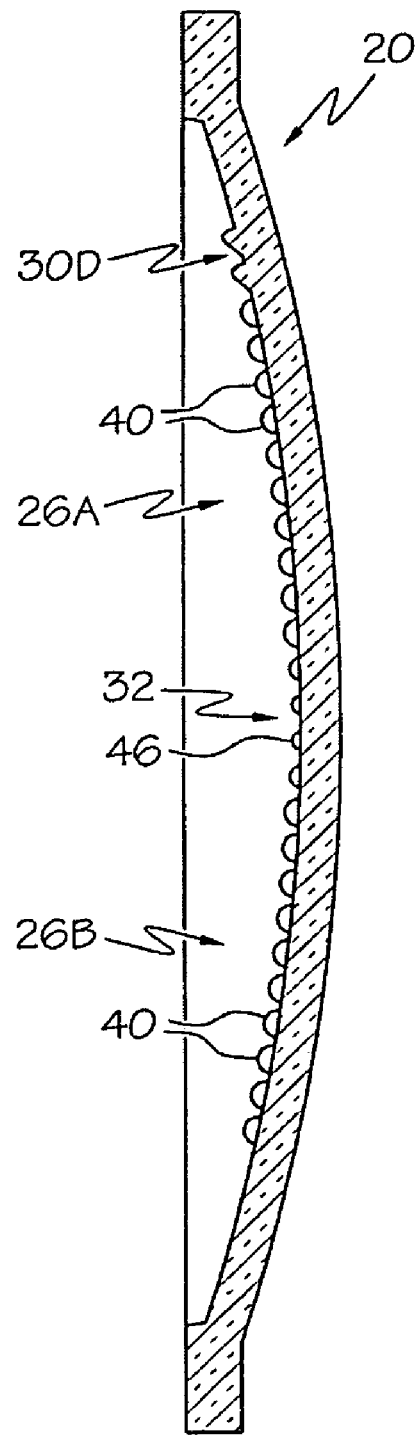
FIG. 6 is a cross-sectional view taken along line 6-6 through the selectable beam lens of FIG. 2.
Figure 7:
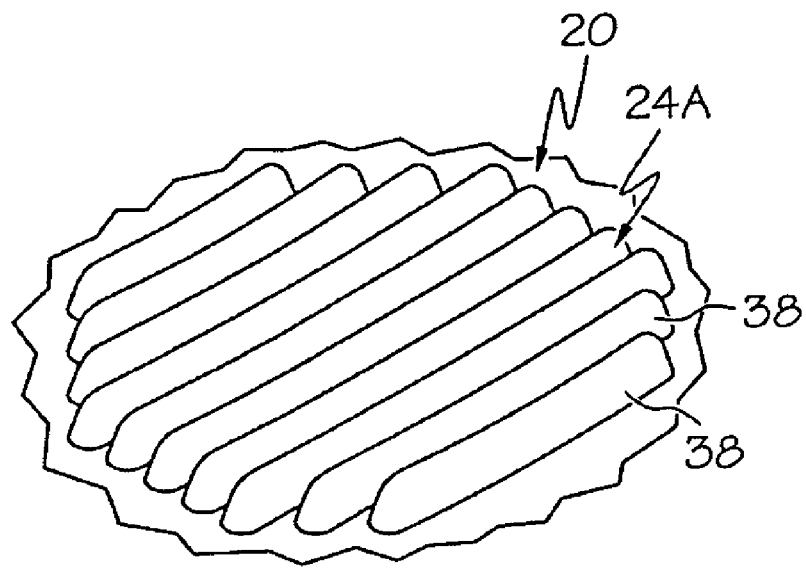
FIG. 7 is a perspective, torn-away view of the first primary light-directing area of the selectable beam lens of FIG. 2.
Figure 8:
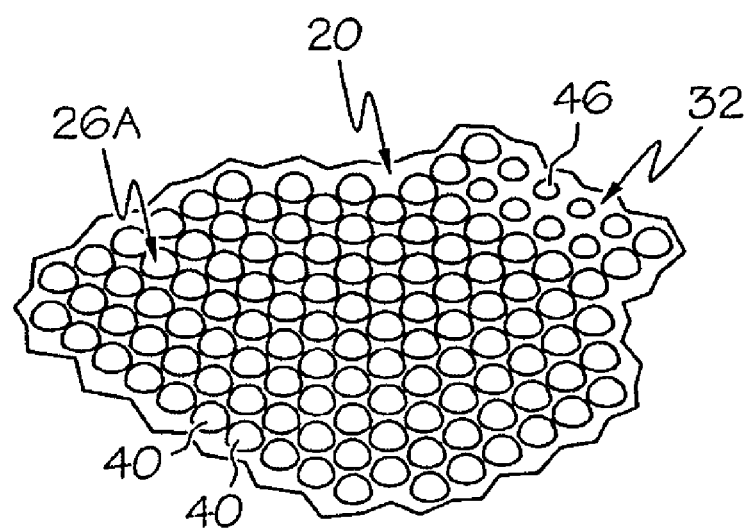
FIG. 8 is a perspective, torn-away view of the second primary light-directing area of the selectable beam lens of FIG. 2.

As is shown in FIGS. 5 and 6, the lens 20 has a convex outer surface and a concave inner surface. Moreover, FIGS. 5 and 6 are cross-section views of the lens that show the first and second, respectively, light-directing areas 24A, 24B and 26A, 26B. FIGS. 7 and 8 are, respectively, perspective views of a first light-directing areas and a second light-directing areas (e.g., 24A and 26A). It is to be appreciated that shapes, dimensions, etc. of the shown example, are merely examples and are not required limitations on the present invention.

Turning to the specifics of the example light-directing areas, the two areas (e.g., 24A and 26A) have different types of protrusions 38 and 40 to refract light differently. The first primary light-directing area (e.g., 24A) is made up of elongate prism-like protrusions 38, which are arranged such that the elongation directions of all of the protrusions are generally parallel. In one example, the elongate protrusions 38 have a height that is approximately ⅛ of an inch high. It should be further noted that in one specific example, the elongated protrusions 38 are asymmetrical when viewed from their ends. Specifically, the elongate protrusions 38 are somewhat inclined away from the central axis 22 of the lens 20. However, it is to be appreciated that such dimensions and configurations are not required limitations of the present invention. Also, such configuration may be associated with overall curvature of the concavity/convexity of the lens, the manufacture process, etc. The first light-directing area (e.g., 24A) has a propensity to direct light transverse to the elongation of the protrusions 38.

The second primary light-directing area (e.g., 26A) is made up of matrices of hemi-spheroid (e.g., beadlike) protrusions 40. Each beadlike protrusion 40 has a generally circular cross-section taken along the protrusion extent (e.g., along an individual protrusion axis). Each beadlike protrusion 40 also has a slight conical configuration as the protrusion extends upwardly from the point of contact with the overall lens structure. In one example, each beadlike protrusion 40 has a diameter of approximately 3/16 of an inch across the base and a height that is approximately 1/16 of an inch high. However, it is to be appreciated that such dimensions and configurations are not required limitations on the present invention. The second light-directing area (e.g., 26A) has a propensity to direct light omni-directionally within the hemisphere in front of the lens.

Turning to the specifics of the example, as shown in the FIG. 2, for the ancillary light-directing areas 30A-30D and 32, these areas cover portions of the surface of the lens 20 different than portions covered by the primary light-directing areas 24A, 24B and 26A, 26B. The first and second ancillary light-directing areas 30A-30D and 32 have protrusions 44 and 46, respectively. The protrusions 44 and 46 are less pronounced (e.g., lower height) than the protrusions 38 and 40 of the primary light-directing areas 24A, 24B and 26A, 26B. In the shown example, the protrusions 44 and 46 of the first and second ancillary light-directing areas 30A-30D and 32 are, respectively, parallels of semi cylinder-like protrusions and matrices of hemi-spheroid (beadlike) protrusions.

The elongate protrusions 44 of the first ancillary light-directing areas 30A-30D have a height that is less than the height of the protrusions 38 within the first primary light-directing areas 24A, 24B. In one example, the height of the elongate protrusions 38 is approximately 1/16 of an inch. It is to be appreciated that the protrusions 40 of the second primary light-directing areas 26A, 26B have a height that is approximately the same as the height of the elongate protrusions 44 of the first ancillary light-directing areas 30A-30D. However, such dimensioning is not a required limitation of the present invention.

In the shown example, the second ancillary light-directing area 32 does not have a definite border from second primary light-directing areas 26A, 26B because of the use of beadlike protrusions for all of these areas. The second ancillary light-directing area 32 merely comprises beadlike protrusions 46 that diminish in size as protrusion to axis distance diminishes. The beadlike protrusions 46 within the center of the second ancillary light-directing area 32 diminish to approximately 1/4 of the height of the beadlike protrusions of the second primary light-directing areas 26A, 26B.

The invention has been described herein above using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

We claim:

1. A lighting device for a wet environment, the lighting device comprising:
   a fixture for location within the wet environment and having an interior with an opening;
   multiple light sources located within the fixture interior; and
   a lens located in front of the fixture and the light sources located therein, the lens enclosing the opening from the wet environment;
      wherein the relative position between the lens and the light sources is variable to align different light-directing areas with the light sources and provide different light beam patterns for light proceeding from the light source through the lens and into the wet environment dependent upon the different light-directing areas and light source alignments resulting from the position variation,
      wherein one of the light-directing areas includes elongate protrusions that are parallel to each other, and another of the light-directing areas includes hemi-spheroid protrusions.

2. A lighting device according to claim 1, wherein the relative position between the lens and the light source is varied by a 90 degrees relative reposition of the lens and the fixture.

3. A lighting device according to claim 1, wherein the lens has a circular periphery and variation of positioning of the lens includes rotation of the lens on a central axis of the lens.

4. A lighting device according to claim 1, wherein the lens position is variable without change of distance between the lens and the light sources.

5. A lighting device according to claim 1, wherein the lighting device is an underwater lighting device, and the beam patterns proceed through water.

6. A lighting device for a wet environment, the lighting device comprising:
   a fixture for location within the environment and having an interior with an opening;
   at least one light source located within the fixture interior; and
   a lens located in front of the fixture and the light source located therein, the lens closing the opening from the wet environment;
      wherein the lens is manually positionable at first and second locations relative to the fixture and the light source therein, the lens has a first light-directing area including elongate protrusions that are parallel to each other for directing light proceeding from the light source in a first manner when the lens is at the first location, and the lens has a second light-directing area including hemi-spheroid protrusions for directing light proceeding from the light source in a second manner, different from the first manner, when the lens is at the second location.

7. A lighting device according to claim 6, wherein repositioning the lens includes rotating the lens, the light source is located within the fixture interior such that the rotation of the lens provides for the repositioning.

8. A lighting device according to claim 6, wherein the first light-directing area has a propensity to direct light transverse to the elongation of the protrusions, and the second light-directing area has a propensity to direct light omni-directionally within a hemisphere.

9. A lighting device according to claim 6, wherein light proceeding from the light source in the first manner creates a first distinct beam pattern and light proceeding from the light source in the second manner creates a second distinct beam pattern, wherein the lighting device is an underwater lighting device, and the first and second distinct beam patterns proceed through water.

* * * * *